US006460438B2

(12) United States Patent
Richards et al.

(10) Patent No.: US 6,460,438 B2
(45) Date of Patent: *Oct. 8, 2002

(54) FACING TOOL

(75) Inventors: Charles N. Richards, Aurora; Ronald K. Fisher, Jr., Rootstown; James M. Kane, Twinsburg, all of OH (US)

(73) Assignee: Swagelok Company, Willoughby, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/292,504

(22) Filed: Apr. 15, 1999

(65) Prior Publication Data

US 2001/0001934 A1 May 31, 2001

Related U.S. Application Data

(60) Provisional application No. 60/092,261, filed on Jul. 10, 1998.

(51) Int. Cl.⁷ .............................. B23B 5/16; B23B 27/00
(52) U.S. Cl. ................. 82/113; 82/128; 407/2
(58) Field of Search .......................... 82/113, 115, 128, 82/165, 901; 407/2, 4, 6, 5, 104, 105, 114, 115

(56) References Cited

U.S. PATENT DOCUMENTS

| 1,358,040 A | | 11/1920 | Trundle, Jr. | |
| 2,499,658 A | | 3/1950 | Livingston et al. | |
| 3,103,140 A | | 9/1963 | Connelly | |
| 3,591,306 A | * | 7/1971 | Kaser | .................. 408/204 |
| 3,661,472 A | * | 5/1972 | Beauloye | ............... 82/113 X |
| 3,662,444 A | * | 5/1972 | Erkfritz | ................... 407/41 |
| 3,875,831 A | | 4/1975 | Beauloye | |
| 3,938,411 A | | 2/1976 | Jonelis et al. | |
| 4,041,812 A | * | 8/1977 | Jioio et al. | ................. 82/152 |
| 4,054,394 A | | 10/1977 | Neuman | |
| 4,254,680 A | | 3/1981 | Gauthier | |
| 4,319,503 A | | 3/1982 | Saine et al. | |
| 4,365,528 A | | 12/1982 | Astle | |
| 4,402,136 A | * | 9/1983 | Rast | ..................... 82/113 X |
| 4,422,356 A | | 12/1983 | Pertle | |
| 4,434,689 A | | 3/1984 | Nall et al. | |
| 4,437,366 A | | 3/1984 | Astle | |
| 4,470,734 A | | 9/1984 | Miller | |

(List continued on next page.)

FOREIGN PATENT DOCUMENTS

| DE | 1936 637 | 1/1970 |
| EP | 0 148 017 | 7/1986 |
| WO | WO 82/01838 | 6/1982 |

(List continued on next page.)

OTHER PUBLICATIONS

International Search Report for PCT/US99/16243.
Tube Severing and Squaring Equipment, 300 and 500 Series Maching Equipment—manual from Tri–Tool, Inc.

(List continued on next page.)

Primary Examiner—Henry Tsai
(74) Attorney, Agent, or Firm—Calfee, Halter & Griswold, LLP

(57) ABSTRACT

A facing tool includes a fixture that securely holds a workpiece, and a fixture retainer that secures the fixture and workpiece against axial and radial movement during a facing operation. In one embodiment, the fixture includes a two piece construction that allows a first piece to be swung away from the second piece to accommodate a variety of sizes of workpieces. Provision is also made for a positive load on the cutting tool to reduce or eliminate tool vibration, as well as a chip shield that deflects debris away from the workpiece. A tool spindle is provided that allows for a plurality of cutting tool positions on the spindle to accommodate different workpiece diameters.

16 Claims, 9 Drawing Sheets

U.S. PATENT DOCUMENTS

| | | | |
|---|---|---|---|
| 4,483,223 A | | 11/1984 | Nall et al. |
| 4,483,522 A | | 11/1984 | Nall et al. |
| 4,493,232 A | | 1/1985 | Nall |
| 4,543,861 A | | 10/1985 | Kwech et al. |
| 4,556,774 A | | 12/1985 | Kazlaauskas |
| 4,655,108 A | | 4/1987 | Galos |
| 4,667,548 A | | 5/1987 | Astle et al. |
| 4,677,884 A | | 7/1987 | Kewch et al. |
| 4,739,682 A | * | 4/1988 | Birkestrand .................. 82/113 |
| 4,754,672 A | | 7/1988 | VanderPol |
| 4,762,038 A | | 8/1988 | Olson |
| 4,810,848 A | | 3/1989 | Kazlauskas |
| 4,815,347 A | | 3/1989 | Rogers |
| 4,823,655 A | | 4/1989 | VanderPol |
| 4,857,690 A | | 8/1989 | Kazlauskas |
| 4,896,812 A | | 1/1990 | Kaslauskas |
| 4,955,263 A | | 9/1990 | VanderPol et al. |
| 4,958,542 A | | 9/1990 | Skerrett |
| 4,973,823 A | | 11/1990 | Benway et al. |
| 4,981,055 A | | 1/1991 | VanderPol et al. |
| 5,054,342 A | | 10/1991 | Swiatowy et al. |
| 5,076,122 A | | 12/1991 | Katzenburger et al. |
| 5,083,484 A | | 1/1992 | VanderPol et al. |
| 5,197,362 A | | 3/1993 | Birkestrand |
| 5,199,221 A | | 4/1993 | Hillestad |
| 5,310,982 A | | 5/1994 | Jusionis |
| 5,322,399 A | | 6/1994 | Felbush |
| 5,393,176 A | | 2/1995 | Waring |
| 5,542,177 A | | 8/1996 | Hillestad |
| 5,605,084 A | | 2/1997 | Pierce |
| 5,619,893 A | | 4/1997 | Pierce |
| 5,671,646 A | | 9/1997 | Sandford et al. |
| 5,678,464 A | | 10/1997 | Way |
| 5,686,002 A | | 11/1997 | Flood et al. |
| 5,692,422 A | | 12/1997 | Pierce |
| 5,704,735 A | * | 1/1998 | Moreau ....................... 407/33 |
| 5,711,197 A | | 1/1998 | Ohmi et al. |
| 5,738,268 A | | 4/1998 | VanderPol et al. |
| 5,743,539 A | | 4/1998 | VanderPol et al. |
| 5,794,949 A | | 8/1998 | Pierce |
| 5,826,470 A | | 10/1998 | Tremblay |
| 5,863,157 A | * | 1/1999 | Harano et al. ................ 407/42 |
| 5,868,531 A | | 2/1999 | Sandford |
| 5,960,686 A | * | 10/1999 | Bonow ..................... 82/113 X |
| 6,095,725 A | * | 8/2000 | Stahl .......................... 408/223 |
| 6,170,368 B1 | * | 1/2001 | Oles et al. ................... 82/1.11 |

FOREIGN PATENT DOCUMENTS

| | | |
|---|---|---|
| WO | WO 83 02738 | 8/1983 |
| WO | WO 84/00709 | 3/1984 |
| WO | WO 86/03148 | 6/1986 |
| WO | WO 88/02290 | 4/1988 |
| WO | WO 88/04736 | 6/1988 |
| WO | WO 97/02915 | 1/1997 |
| WO | WO 97/47420 | 12/1997 |
| WO | WO 98/01248 | 1/1998 |

OTHER PUBLICATIONS

Protem USA—A Cut Above The Rest, The SL Series Tube Squaring System, manual from the E.H. Wachs Company.
The Wachs Companies, Pipe Construction and Maintenance Systems.
Rabbit Tool USA X+SQ & PC Series.
End Prep Tool Model 0624, Esco Tool.
"ID " Clamping End Prep Tool, Esco Tool.
Orbicut Squaring Machines for Tubes and Fittings 1/8" to 1" OD, Hobart Advanced Systems.
Tube Squaring Machines, Otto Tool.
The 300 Seriess, Tube Squaring and Beveling Tools, Tri Tool Inc. catalog (2 pages), 1991.
The Wachs Companies, 1.0 Fitting Squaring Machine (8/97).
The Wachs Companies, Tube and Fitting Squaring Machine (11/97).

* cited by examiner

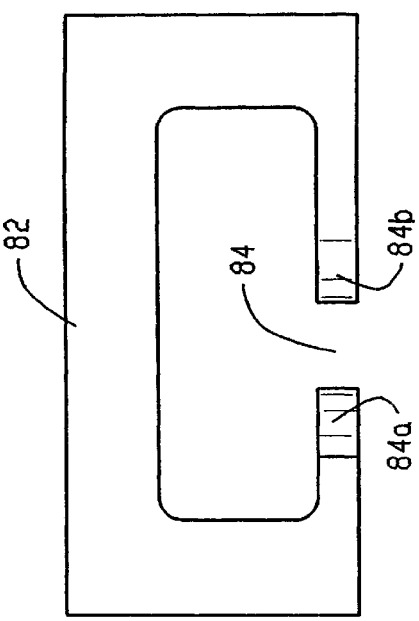
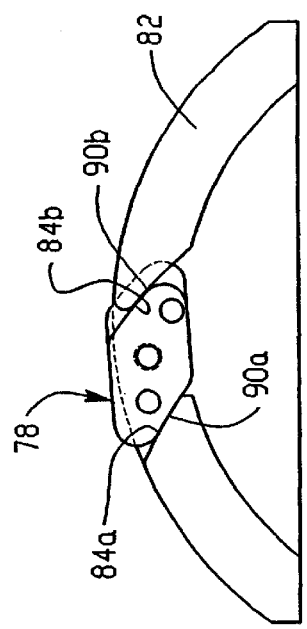
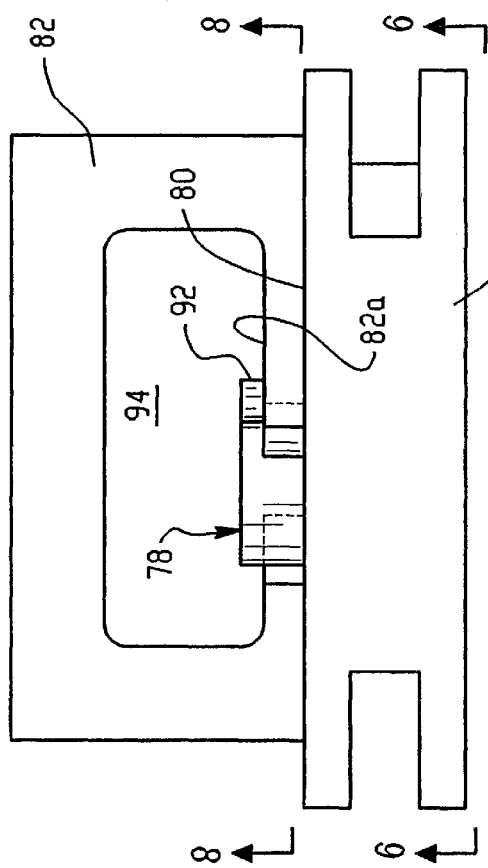
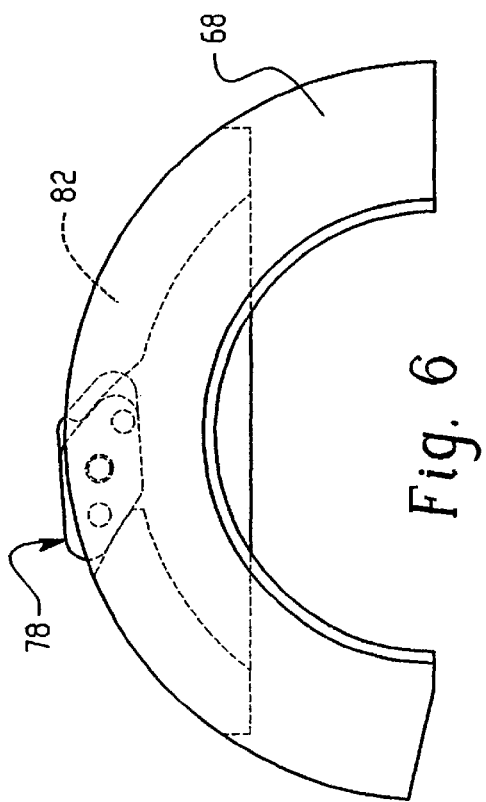

FACING TOOL

This application claims the benefit of provisional application Serial No. 60/092,261 filed Jul. 10, 1998.

TECHNICAL FIELD OF THE INVENTION

The subject invention is directed to methods and apparatus for facing cylindrical workpieces such as tube and pipe ends or the like. More particularly, the invention is directed to facing tools for accommodating a variety of tube/pipe sizes while preventing unwanted vibration and movement of the workpiece and tool during a facing operation.

BACKGROUND OF THE INVENTION

Metal tubes and pipes are commonly used as conduits for fluids such as gases and liquids used in a wide variety of applications. Often these conduits run throughout a facility over great distances. Tubes and pipes are manufactured in a variety of lengths and sizes. In order to assemble the conduits in long runs, a plurality of such conduits may be butt welded together end to end. The conduits further may be welded to various flow control devices such as valves, mass flow meters, manifolds, elbows and so on. The tube or pipe typically is cut to a specified length by any convenient means such as a tube cutter or even a hacksaw.

A cut tube or pipe end usually is not in good condition for immediate welding. The cut end of such a workpiece is finished or "faced" so that the end is square and chips, burrs and other anomalies are removed. This provides a tube or pipe end that can then be more easily welded to another tube or pipe end, flow device or other tube/pipe end attachment.

The cut end is prepared using a facing tool. Generally, facing tools have a cutting tool that is rotated by a motor or other drive device. The cutting tool is brought into contact with the end of the workpiece and shaves off material from the cut end to form a clean square end.

Known facing tools have a number of design features that limit their overall usefulness. Such tools, for example, do not adequately hold the workpiece still during a facing operation. With the cutting tool rotating at high speed, vibration of the cutting tool itself or movement and vibration of the workpiece can reduce the overall quality of the finished end, possibly necessitating additional facing, manual re-work or scrap.

Known facing tools further suffer from limitations on the workpiece diameters that can be faced using a specific tool configuration. Tubes and pipes, for example, often are used in sizes ranging from ⅛-inch to 2-inch diameters in quarter- or half- inch increments or less. On a typical shop floor, a facing tool may need to be used on a variety of such sizes. Known tools require substantial re-configuration when the facing tool is used to face different sized workpieces. In some cases, both the fixture that holds the workpiece as well as the cutting tool must be changed to accommodate the next workpiece size. This further necessitates additional parts for the facing tool which must be carried with the tool to the job site.

It is desired, therefore, to provide a facing tool that substantially reduces workpiece and cutting tool vibration while at the same time permitting a variety of workpiece sizes to be faced with less re-configuration of the facing tool.

SUMMARY OF THE INVENTION

In accordance with one embodiment of the invention, a facing tool includes a fixture that securely holds a workpiece, and a fixture retainer that secures the fixture against axial and radial movement during a facing operation. In one embodiment, the fixture includes a two piece construction that allows a first piece to be swung away from the second piece to accommodate a variety of sizes of workpieces.

In accordance with another aspect of the invention, a facing tool includes a tool spindle that has a cutting tool insert mounted thereon wherein the cutting tool insert is positively loaded against of surface of the spindle to reduce vibration and movement of the tool during a facing operation. In accordance with another aspect of the invention, the spindle is formed with number of recesses or pockets that can receive a cutting tool to allow for facing operations on different sized workpieces. Still a further aspect of the invention is the provision of a chip shield that deflects material removed by the cutting tool away from the workpiece during the facing operation.

These and other aspects and advantages of the present invention will be apparent to those skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein:

FIG. 5 is a plan view of a fixture retainer and catch assembly;

FIG. 6 is a front end view of the retainer and catch assembly of FIG. 5 taken from line 6—6;

FIG. 7 is a plan view of the fixture retainer of FIG. 5 with the fixture catch swung away;

FIG. 8 is an end view of the fixture retainer and catch assembly of FIG. 5 taken from line 8—8 of FIG. 5;

DETAILED DESCRIPTION OF THE PREFERRED EMBODIMENTS

Figure 1:
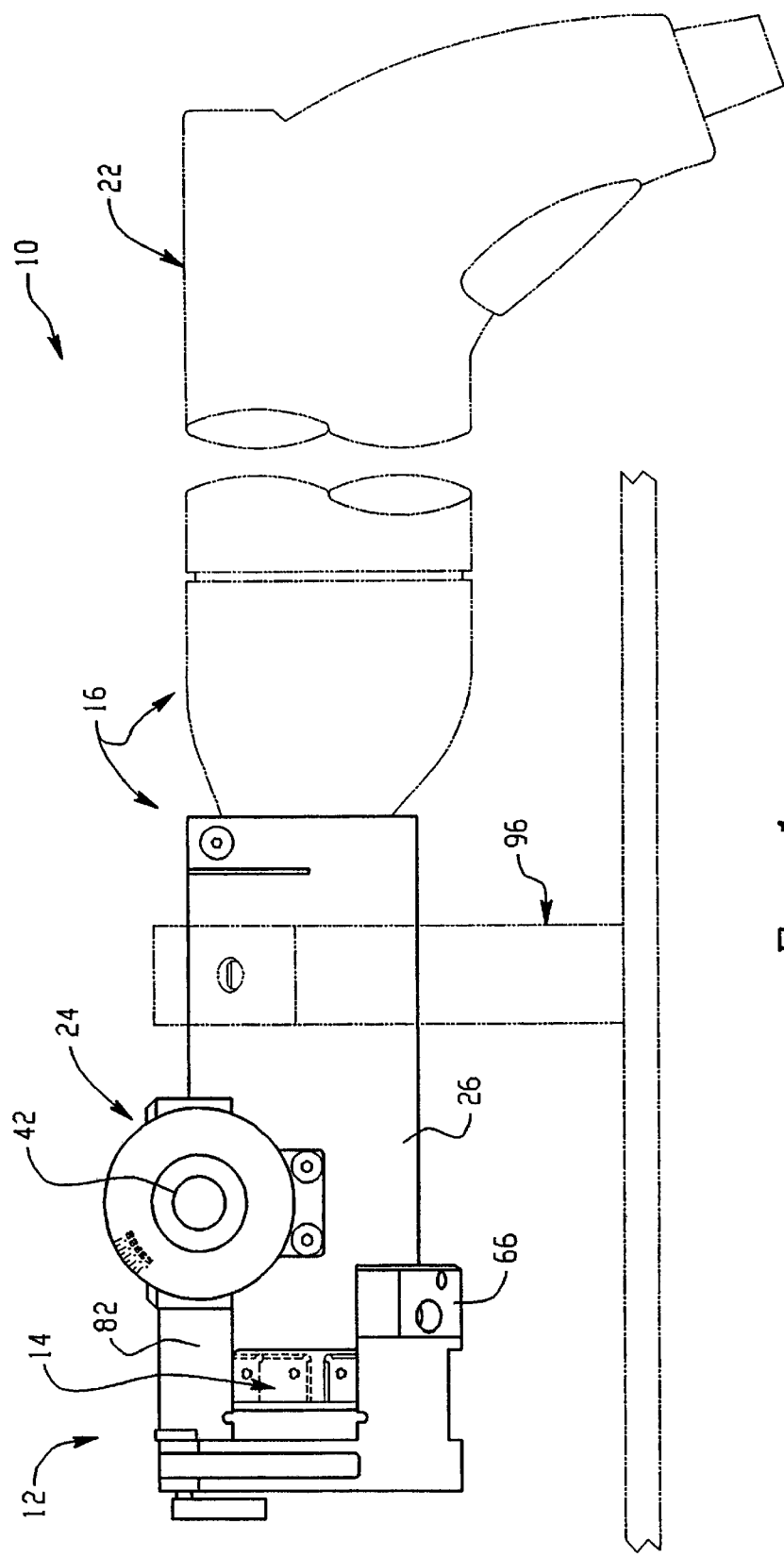
FIG. 1 is an elevation view of a facing tool in accordance with the present invention.

Referring now to the drawings wherein the showings are for the purposes of illustrating preferred embodiments of the invention only and not for purposes of limiting same, FIG. 1 illustrates an embodiment of the invention for a facing tool 10 that includes a fixture 12, a cutting tool assembly 14, and a cutting tool drive mechanism 16. The fixture 12 securely holds a workpiece W (not shown in FIG. 1) for facing and end thereof. Although the preferred embodiments of the invention are described herein with reference to facing a tube end, such description is intended to be exemplary in nature for purposes of explanation and illustration. The present invention can be used to face a variety of workpieces including tubing, piping, fittings and so on. Any hollow cylindrical workpiece can be faced using the present invention provided that a proper fixture is used to hold the workpiece W in alignment with the cutting tool assembly 14.

In this embodiment, the cutting tool assembly 14 includes a tool spindle 18 (FIG. 10) and a cutting tool 20. The cutting tool 20 (also referred to herein as a cutting tool insert) is securely mounted on the spindle 18 in a manner described hereinafter to minimize tool vibration. The spindle 18 includes a plurality of tool 20 recesses or pockets (102, FIG. 9) to permit more than one tool insert 20 to be installed on the spindle 18 at different radial positions. This allows the same spindle 18 to be used for facing a variety of workpiece sizes, as will be described herein.

The drive mechanism 16 is conventional in design and includes a motor drive 22 and a spindle position control 24. The motor drive 22 can be any convenient drive device that imparts rotary motion to the spindle 18. In this embodiment, the motor drive 22 is realized in the form of an electric tool motor such as model 1015 available from METABO. The motor drive 22 may be equipped with a variable speed control if so desired.

Figure 3:
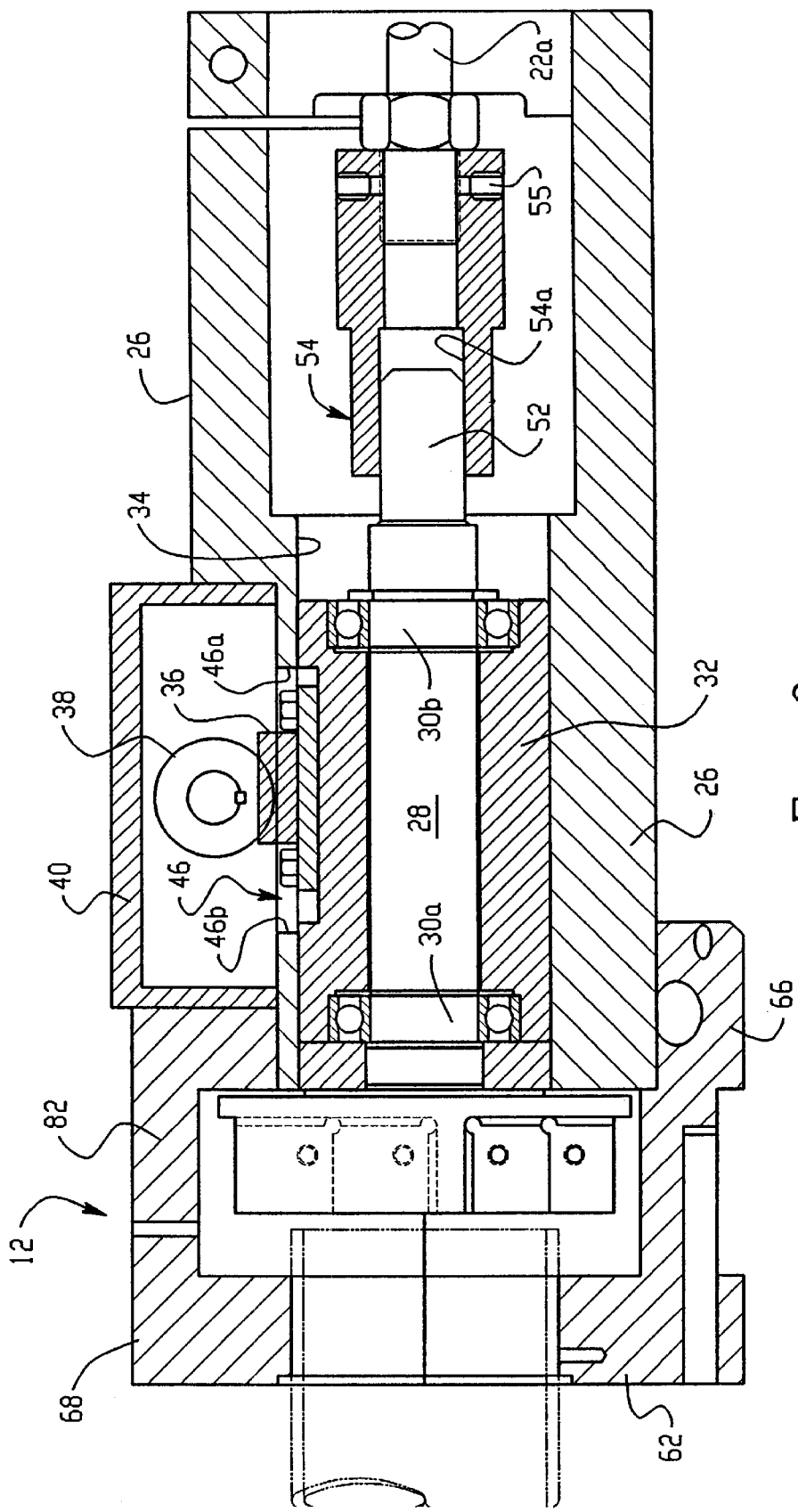
FIG. 3 is a section view along line 3–3 of FIG. 2.

The spindle 18 and the spindle position control 24 are disposed in a main housing 26. As best illustrated in FIG. 3, the spindle 18 is axially supported in the housing 26 and includes a shaft 28 that is supported by a pair of bearings 30a and 30b. The bearings 30a, 30b are captured at opposite ends of a spindle collar 32 by means of a press fit, for example. The collar 32 is appropriately sized to slide freely within a central axial slide bore 34 that extends through the housing 26. The spindle 18 can thus freely rotate at high speed within the collar 32 while at the same time being axially movable by translational or sliding movement of the collar 32 within the bore 34.

Figure 2:
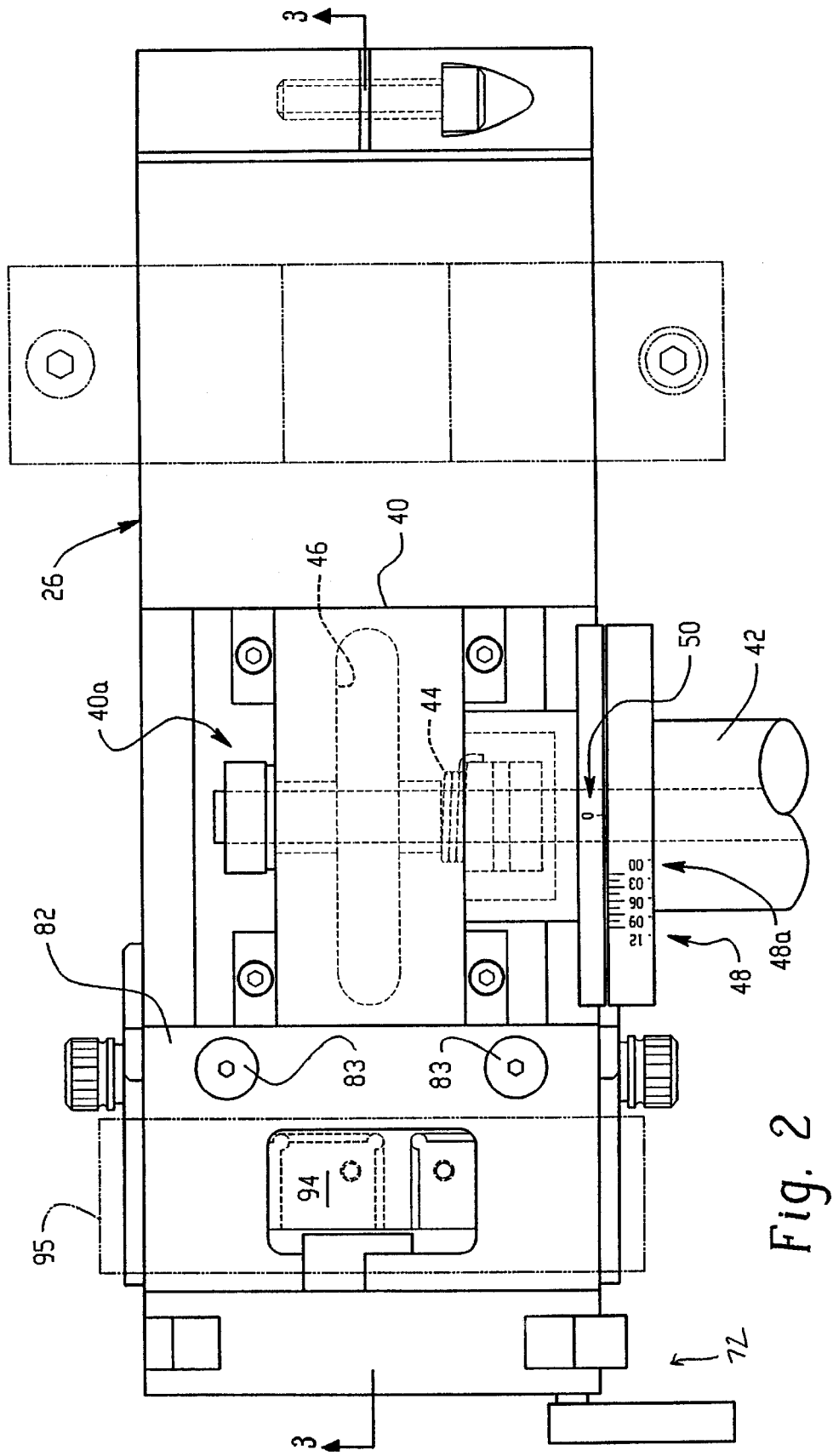
FIG. 2 is a top view of the facing tool of FIG. 1.

Mounted on the outer surface of the collar 32 is a rack gear 36 that cooperates with a pinion gear 38. The pinion 38 is disposed in a gear housing 40 that can be attached to or part of the main housing 26. As best illustrated in FIG. 2, the pinion 38 is supported in the gear housing 40 at one end 40a and is attached to a control handle 42 at an opposite end. The handle 42 extends transversely from the main assembly and may include grips or other means for assuring easy positive manual rotation of the handle 42. A return spring 44 is captured between the handle 42 and the housing 26. The spring 44 applies a rotational bias to the handle 42 in a direction so as to draw the spindle 18 away from the workpiece W. Thus, in the absence of manual override, the spindle 18 is in a retracted position. It should be noted that although the preferred embodiment illustrates use of a manual spindle position control 24, a mechanized position control could also be used.

The rack 36 can slide axially within a slot 46 formed in the main housing 26. The slot 46 provides a first axial travel stop 46a when the spindle 18 is retracted by the spring 44, and a second axial travel stop 46b to limit the distance that the spindle 18 can travel towards the workpiece. Upon manual rotation of the handle 42, the pinion 38 drives the rack 36 so as to displace the spindle 18 towards the workpiece (FIG. 3). When the handle 42 is released, the spring 44 returns the spindle 18 to the retracted position. In the preferred embodiment, twenty-four (24) degrees of rotation of the handle 42 translates into one-eighth (⅛) inch axial travel of the spindle 18, from the zero position. In this embodiment, the zero position corresponds to a rack 36 position that is spaced a distance from the first stop 46a. The handle 42 may be provided with indicia 48 that informs the operator of how far the spindle 18 is moving based on rotation of the handle 42. In FIG. 3, the handle 42 is in the released position and it will be noted that "zero" position 48a is offset from the alignment mark 50.

Prior to a facing operation, the operator rotates the handle 42 so that the zero mark 48a aligns with the alignment mark 50 and the operator holds that position. A workpiece tube end is inserted into the fixture 12 until the tube end engages the spindle 18 cutting end. The workpiece is then clamped or secured in the fixture 12 (as will be described herein). This zero position calibration is performed without the motor drive 22 running. In this manner, the operator knows that when the handle 42 is rotated to the zero mark 48a in alignment with the reference mark 50, the cutting tool 20 is at the workpiece end. Any further rotation of the handle 42 will cause the cutting tool to begin removing material from the workpiece, and the indicia 48 can be used to help control or monitor how much material is removed.

The spindle shaft drive end 52 (FIGS. 10 and 3) is a male hex shape, for example, that is inserted into a first end of a sleeve coupling 54. The first end of the coupling sleeve 54 is a mating female hex shape that corresponds to the male hex shape of the spindle drive end 52. The spindle drive end 52 slides freely in the sleeve coupling 54 over at least a length that corresponds with the maximum stroke of the spindle 18 (as controlled by rotation of the handle 42). The sleeve coupling 54 is coupled at a second end thereof to a drive shaft 22a of the motor drive 22 and secured thereto with a brass tip set screw 55. In this manner, the spindle 18 is rotatably driven by the motor 22 while also being able to be axially moved by rotation of the control handle 42. The spindle shaft 52 rotates with the sleeve 54 due to the mating male and female hex shapes, and the spindle shaft 28 can also axially slide within the sleeve 54. The sleeve 54 is fixed against axial movement by its pinned connection to the motor 22 drive shaft.

Figure 4:
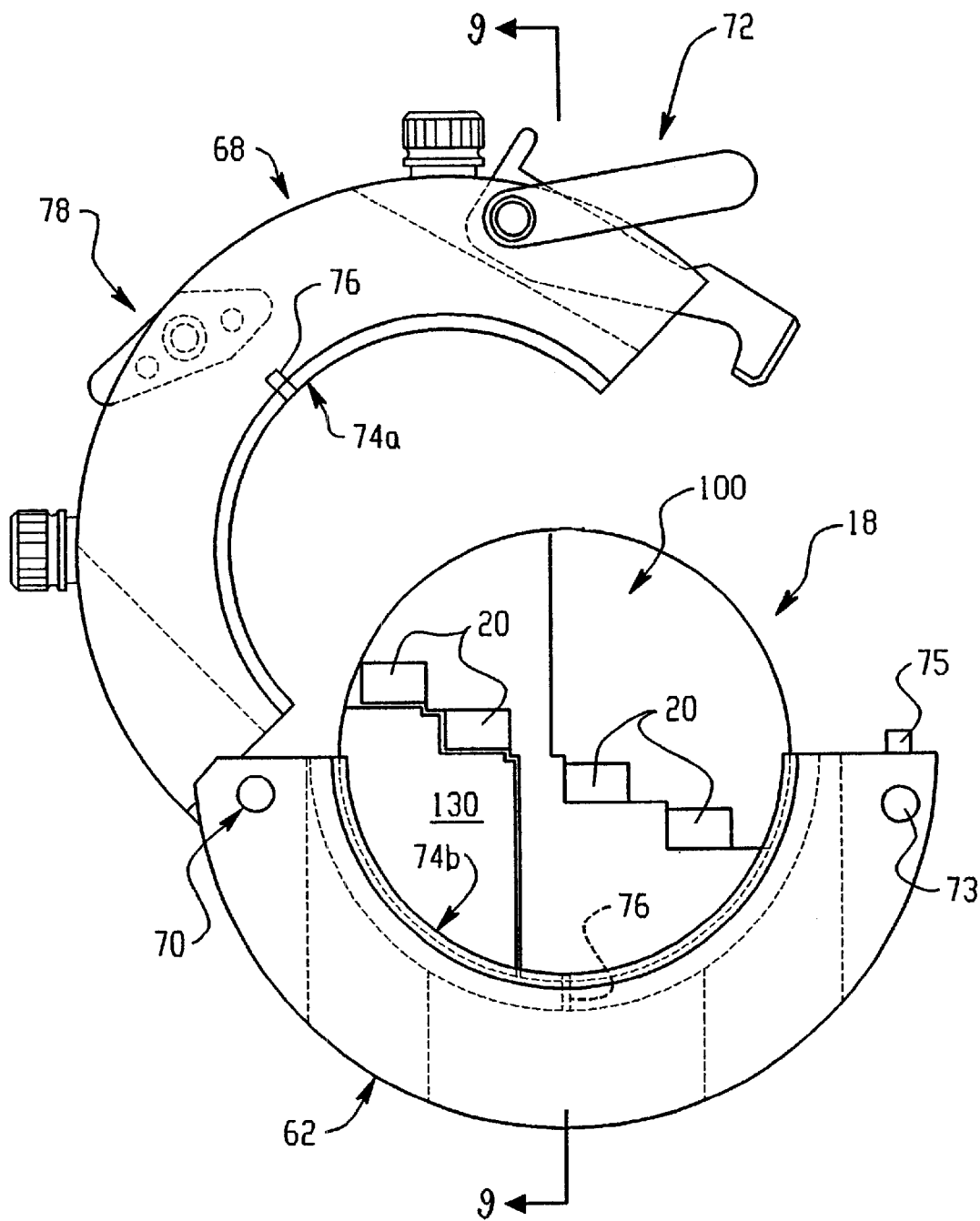
FIG. 4 is a tool end view of the facing tool with the tool fixture in an open position.

With reference to FIG. 4, the fixture 12 is used to securely hold or clamp a workpiece during a facing operation. In accordance with one aspect of the invention, a fixture is provided that can accommodate a wide variety of workpiece sizes with minimal changeover requirements when changing sizes. In accordance with another aspect of the invention, the fixture 12 includes a retainer assembly that rigidly secures the fixture against vibration and other undesirable axial and radial displacement during a facing operation. In this way, the fixture 12 can securely hold the workpiece in proper alignment with the cutting tool 20 and permit easy size changes.

In this embodiment, the fixture 12 includes a first fixed clamp member 62 that is rigidly mounted on the main housing 26. The clamp member 62 is attached to or integrally formed with a mounting plate 66 (FIG. 3) that is bolted or otherwise conveniently attached to the underside of the housing 26. This positions the fixture 12 generally near the tool end of the spindle 18 and in square alignment therewith.

The fixture 12 further includes a second clamp member 68 that is pivotally attached to the first clamp member 62 as at a hinge joint 70. The hinged connection of the first and second clamp members 62, 68 allows the second clamp 68 to be swung freely to an open position such as illustrated in FIG. 4 and a closed position such as illustrated in FIGS. 1 and 3. With the fixture 12 in the open position, a workpiece can be positioned in the lower fixed clamp member 62 and then the second clamp member 68 is swung over top the workpiece and connected to the lower clamp member 62. A cam operated latch device 72 cooperates with a latch pin 73 and can be used in a conventional manner to clamp the members 62, 68 together and about the workpiece W. The clamps 62, 68 thus function as a holder for the workpiece W. A spring loaded release pin 75 can be used to assist separating the clamps 62, 68 far enough to remove or insert a workpiece without having to fully open the holder in every instance. With or without the release pin 75, oftentimes simply releasing the latch 72 will allow sufficient separation of the clamps 62, 68 to permit a workpiece to be inserted and/or removed from the fixture.

Figure 14:
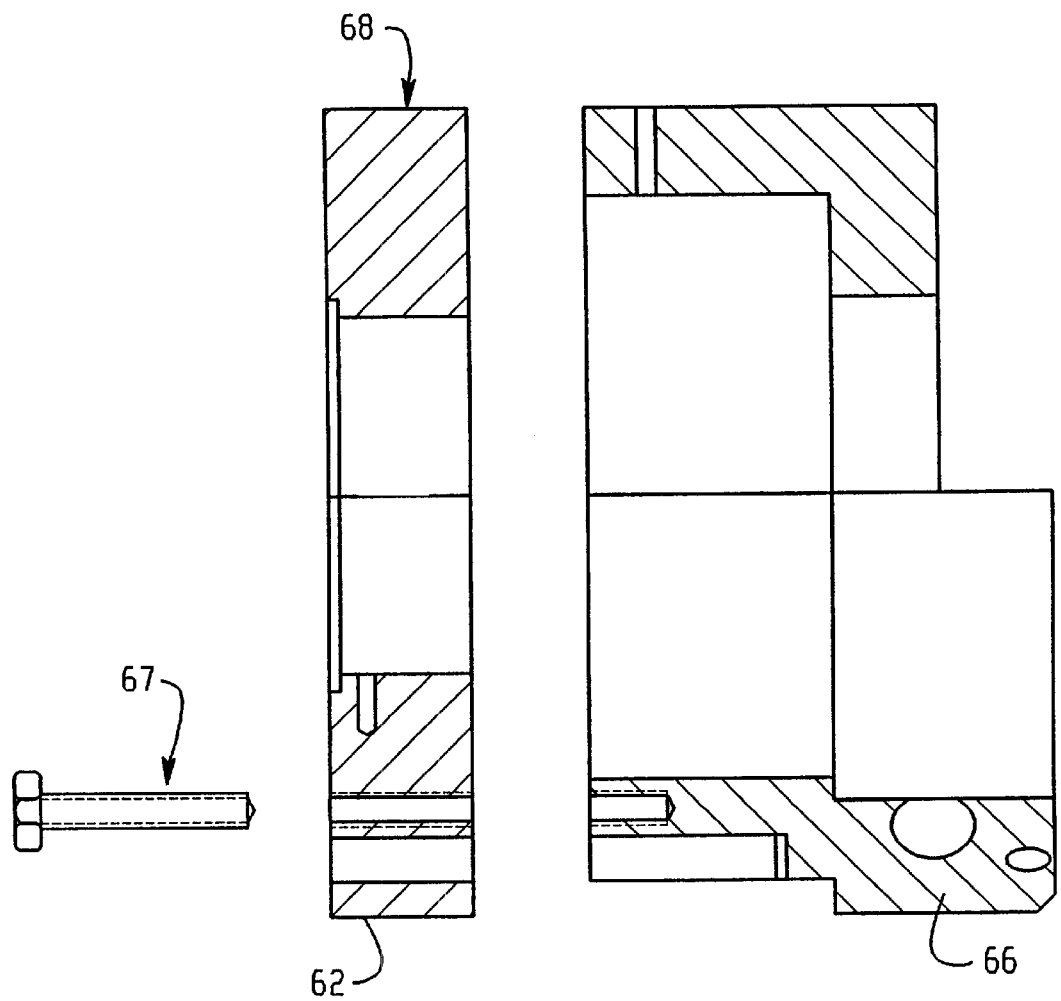
FIG. 14 is an exploded view of an alternative embodiment of a fixture apparatus in accordance with the invention.

FIG. 14 illustrates and alternative embodiment for a mounting arrangement of the clamps 62, 68. In this embodiment, the lower clamp 62 is separate formed and attached to the mounting plate 66. The pinned clamps 62, 68 thus can be installed and removed as a single unit, and clamp size changeovers can be accomplished without having to remove the mounting plate 66. Thus the mounting plate 66 can be rigidly installed on the housing 26, or even integrally formed therewith if so required. The lower clamp 62 is attached to the mounting plate 66 by any convenient means such as bolts 67.

In order to allow the same fixture 12 to accommodate a variety of workpiece diameters, the first and second clamp members 62, 68 can be equipped with collet inserts 74a, b. These collets can be attached to their respective clamp members by any convenient means such as bolts or screws 76. The collets 74 can be provided as a set to permit different size workpieces to be secured in the fixture 12 by simply replacing collets having different radial dimensions. This permits the tool 10 to be used to face a variety of sizes without having to remove the fixture 12 from the tool 10. Alternatively, collets can be integrally formed in the clamp members 62, 68 if required for a particular application.

Although the pivot connection between the clamp members 62, 68 is particularly useful for flexibility in workpiece dimensions, it presents a site of possible vibration and movement of the workpiece during a facing operation. Although the lower clamp member 62 is rigidly affixed to the housing 26, and the upper clamp member 68 is latched rigidly to the lower clamp member 62 by the latch device 72, absent a restraint the collets could vibrate and move due to their extension type mounting to the bottom of the housing 26.

To avoid such undesired movement of the fixture 12 and the workpiece W, the upper or pivoting clamp member 68 includes a fixture catch 78. The catch 78 is mounted on or integral to a rearward surface 80 of the upper clamp member 68. In the described embodiment the catch 78 is positioned so that when the upper clamp member 68 is closed and secured with the latch device 72, the catch 78 is positioned generally near the top of the overall fixture 12 (it will be appreciated that positional references herein such as "top" and "bottom" are merely for convenience of reference to the illustrated views, it being understood that the facing tool 10 can be in practice oriented in any number of positions).

With reference to FIGS. 5–8, a fixture retainer 82 in the form of an arcuate plate is rigidly mounted on the main housing 26 as by bolts 83 (FIG. 2) or other convenient means. The retainer 82 extends axially beyond the forward end of the housing 26. A retainer groove or slot 84 (FIG. 7) is provided at an outer peripheral edge of the retainer 82. This retainer groove 84 is formed with two arced radial ends 84a, b with the radius of the arc being referenced to the hinge joint 70 (see FIG. 4). The fixture catch 78 is formed with complementary arced surfaces 90a and 90b so that the catch 78 mates with and is captured in the retainer groove 84 when the upper clamp member 68 is in the closed and latched position (see FIGS. 5 and 8). The complementary arced surfaces of the catch 78 and the groove 84 allow the upper clamp member 68 to be freely rotated to and from the closed position. The tolerances between the catch 78 and the groove 84 should be closely held so that the catch 78 is prevented from radial displacement during a facing operation.

As best illustrated in FIG. 5, the fixture catch 78 includes a flange 92 that abuts a rear surface 82a of the fixture retainer 82 when the upper clamp member 68 is in its closed position. The flange 92 thus prevents or substantially eliminates axial displacement of the fixture 12 away from the cutting tool 20 during a facing operation. The fixture 12 and workpiece W would otherwise tend to move axially away from the rotating tool 20 when the tool 20 is brought into engagement with the workpiece. The fixture catch 78 and retainer 82 thus cooperate to secure the fixture 12 and workpiece W against undesired axial and radial movement or vibration during a facing operation by providing a rigid securement of the upper clamp member 68 to the main housing 26.

The fixture retainer 82 may be provided with a partial cutout 94 to permit the operator to observe the facing operation. A clear shield 95 (shown in phantom in FIG. 2) such as made of plastic or other suitable material can be provided to cover the cutout 94 to prevent chips and shavings from passing through the cutout 94.

A bench stand 96 (FIG. 1) can be used if so required to support the facing tool 10 in an elevated position.

Figure 10:
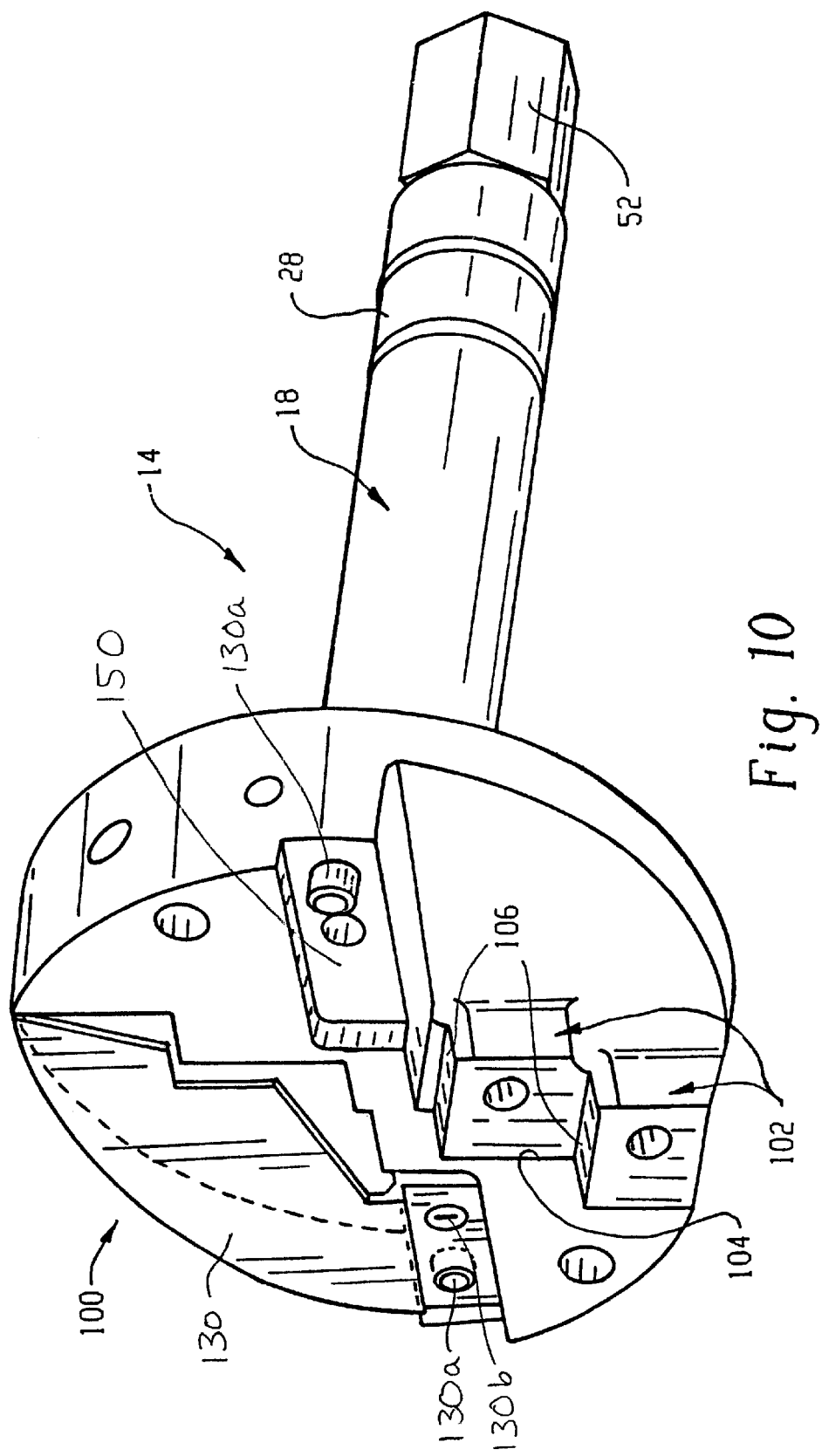
FIG. 10 is a simplified isometric of a tool spindle used with the facing tool of the present invention.

With reference to FIGS. 10 and 4, the spindle 18 includes an end face 100 that is axially opposite the spindle drive end 52. The spindle end face 100 preferably has a plurality of cutting tool receptors, recesses or pockets 102 formed therein. In the exemplary embodiment, the spindle 18 is provided with four tool pockets 102, although only a single one is required for a facing operation. The use of a plurality of pockets 102 permits a number of cutting tools 20 to be carried by the spindle 18 wherein different ones of the cutting tools 20 are used to face respective workpiece diameters. Alternatively, a single cutting tool 20 can simply be positioned in the correct pocket 102 for the size workpiece being machined. The combination of the pivoted clamp members 62, 68, collets 74 and different cutting tool 20 positions provide substantial flexibility in the range of sizes of workpieces that can be faced with little or no reconfiguration required of the fixture 12 or cutting tools 20. In the described embodiment, using four tools 20 on the spindle 18 with a single collet 74 or clamp 62, 68 arrangement allows the facing tool 10 to face ⅛-inch to 2-inch diameter workpieces without having to change the fixture 12, tools 20 or the spindle 18 in most cases.

As best illustrated in FIG. 10, each cutting tool pocket 102 is provided by forming a recessed axially oriented pocket wall 104 in the spindle 18 end face. The axial wall 104 adjoins transversely a radially oriented second pocket wall 106. In the context of the pockets 102, the terms "radial wall" and "axial wall" are simply points of reference with respect to the illustration of FIG. 10. For clarity the cutting tool inserts 20 are omitted in FIG. 10.

Figure 9:
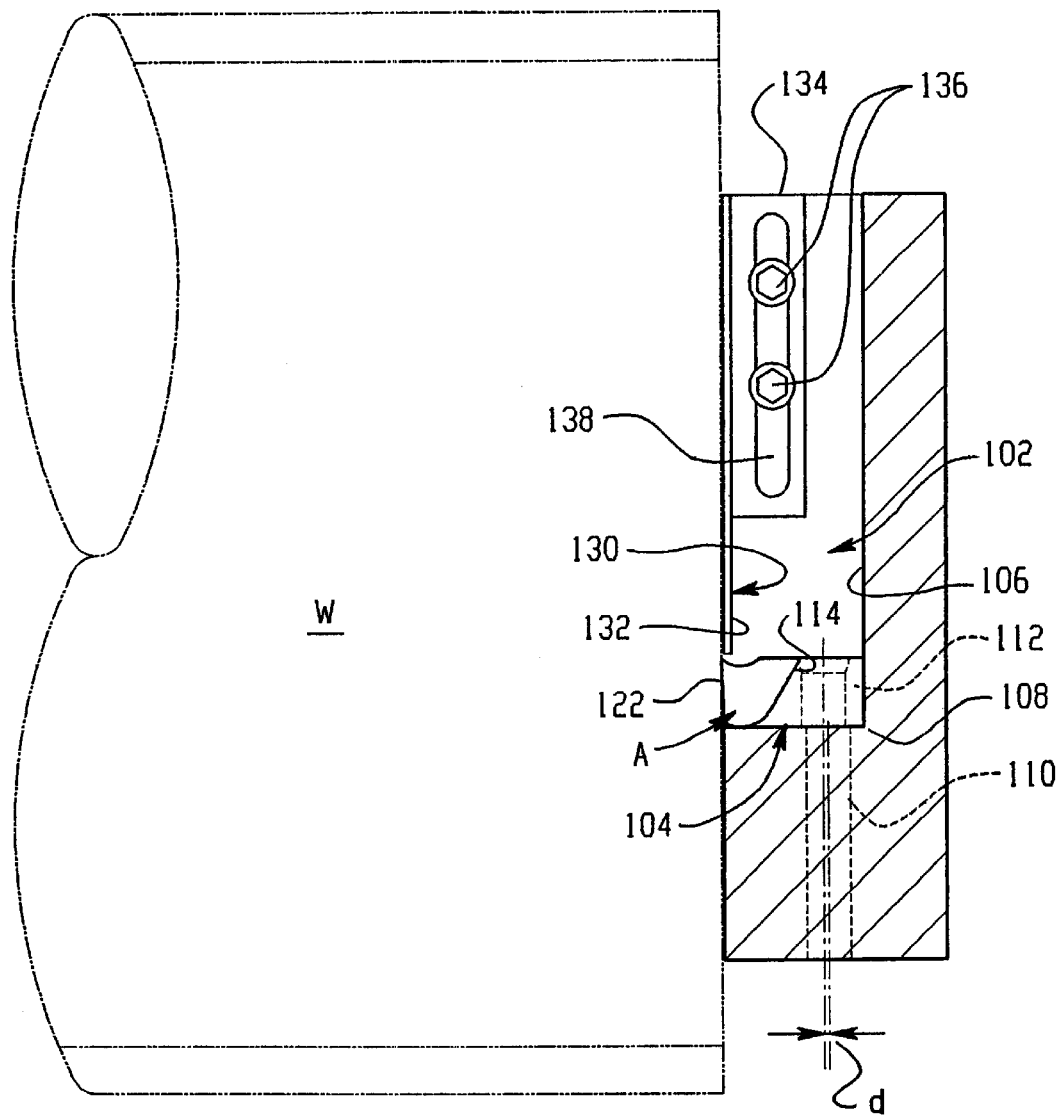
FIG. 9 is a section view along line 9—9 in FIG. 4.

With reference to FIG. 9, a cutting tool insert 20 is dimensioned to fit with a corner 108 thereof in a tool pocket 102. A threaded hole 110 is formed in the axial pocket wall 104, and a corresponding hole 112 extends through the cutting tool 20. The outer end of the tool hole 112 is provided with a taper 114. In order to rigidly and securely mount the tool insert 20 in the pocket 102, the center line of the tool hole 112 is slightly offset from the center line of the pocket hole 110. In the drawing this offset is represented in an exaggerated manner for clarity and ease of illustration as an offset "d". In practice, for example, the holes 110 and 112 may be offset 0.0005 inches.

A threaded tapered bolt (not shown for clarity of the illustrations) is screwed into and through the tool hole 112. For the bolt to further be threaded into the pocket hole 110, the tool 20 is forced up against the pocket wall 106. This action places a positive load on the tool 20 against the wall 106 to prevent tool 20 vibration and movement during a facing operation.

Figure 11:
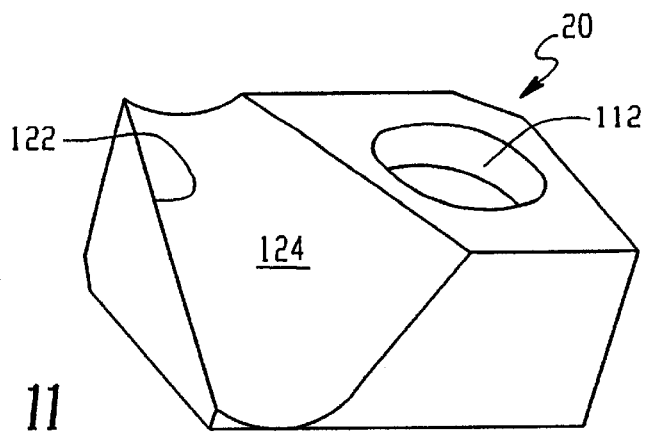
FIG. 11 is an isometric of a cutting tool suitable for use with the invention.
Figure 12:
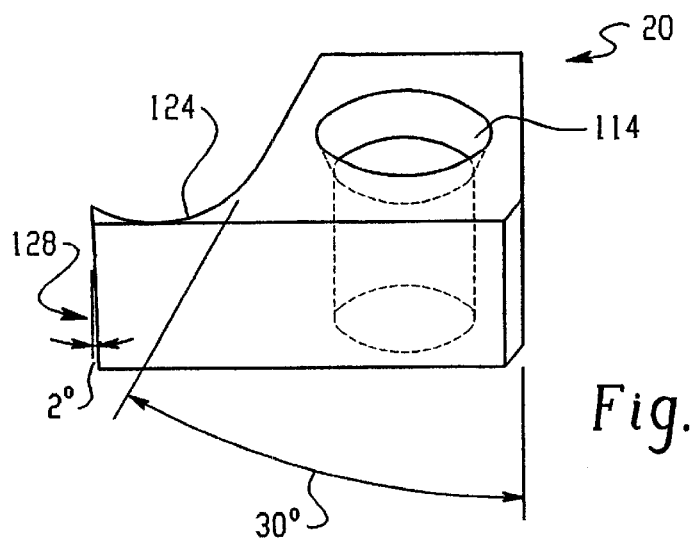
FIG. 12 is an end view of the cutting tool of FIG. 11.
Figure 13:
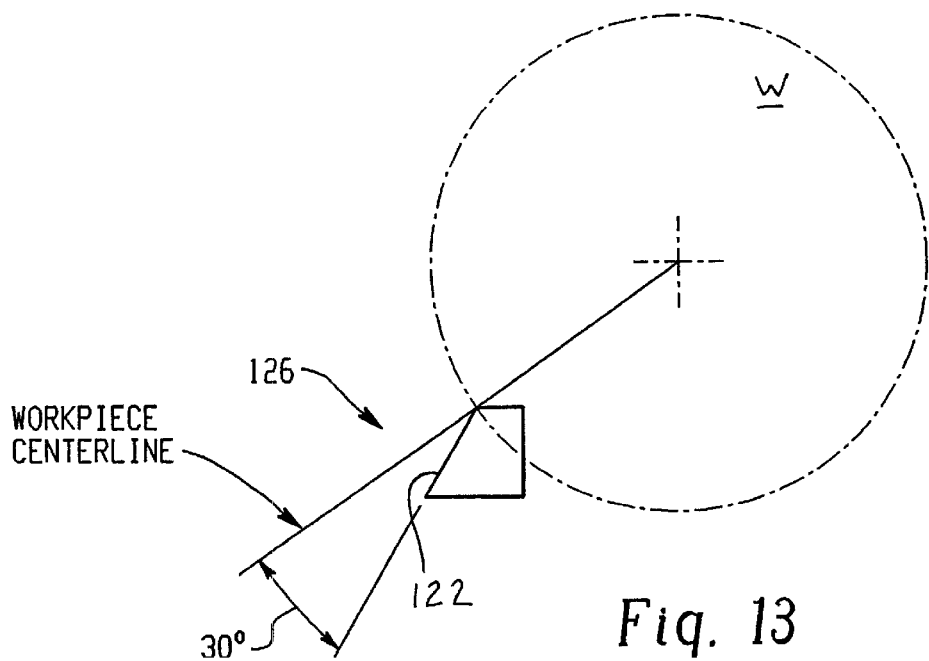
FIG. 13 is a schematic representation of an alignment of the cutting tool with the workpiece.

With reference to FIG. 11, each cutting tool 20 includes a cutting knife edge 122 with a curved or radiused surface 124. The tool 20 is preferably made of T15 high speed tool steel, for example, with a titanium nitride coating. Other suitable tool materials can be used if required. The surface 124 provides a deflection path for metal chips and debris to direct the removed material away from the workpiece W. The cutting edge 122 is angled as at 126 to the horizontal centerline of the workpiece (or the clamping device 62, 68). In the illustrated example, this angle is about 30 degrees (see FIG. 13). Below the cutting edge 122 the tool surface is cut away at a relief angle 128 (FIG. 12). In the illustrated embodiment the relief angle is about two degrees. The off horizontal angle 126 of the cutting edge 122 gives the cutting tool 20 a skiving or shaving action across the tube end as the tool is rotated. The relief angle 128 prevents the non-cutting surfaces of the cutting tool 20 from rubbing against the cut tube end. The combination of the radiused surface 124 and the skive angle 126 directs the removed materials (chips and debris) toward the outside diameter of the workpiece and away from the tube end.

Although the tool 20 design is effective for directing debris away from the workpiece, in some cases, for example, when the facing area has not been cleaned or when a large amount of metal is removed from the workpiece, debris and chips may tend to be directed back into the workpiece cylinder. This necessitates cleaning out this debris after facing.

In accordance with another aspect of the invention, a chip shield 130 may be provided if required. A single shield 130 is illustrated in the drawings, although two or more shields 130 could be used as required and as available based on the spindle and tool configuration. In the illustrated embodiments, each shield 130 is associated with two cutting tool pockets 102.

With reference to FIGS. 2 and 9, the chip shield 130 includes a vertical deflection face 132. This deflection face 132 is positioned slightly axially behind the tool cutting edge 122 and slightly radially spaced therefrom a distance large enough to allow debris and chips to come off the cutting edge 122, pass behind the shield 130 and follow the radiused surface 124, as represented by the directional arrow A. The shield 130 will block chips and debris from being directed back toward the workpiece, as the deflection wall in essence covers the tool pocket 102 axially forward and between the tool 20 and the workpiece. A flange 134 can be provided on the shield 130 to attach the shield to the spindle 18 as by bolts 136. The flange 134 may have a slot 138 for the bolts 136 to permit some adjustment to the shield 130 position, to optimize the deflection of material away from the workpiece.

An alternative mounting arrangement for the shield 130 is illustrated in FIG. 10. In this alternative, the chip shield 130 does not include a bent edge, but rather is a substantially planar device. An alignment hole cooperates with an alignment pin 130a and a screw 130b is used to secure the shield 130 against a recessed flat 150 formed in the spindle 18. Two such mounting flats are illustrated in FIG. 10.

In operation, the fixture 12 is opened and a workpiece is inserted therein. The fixture 12 can be loosely closed about the workpiece to permit adjustment of the axial position of the workpiece. The control handle 42 is rotated to the zero position and held there while the workpiece or tube end is abutted against the cutting tool edge 122. At this time the operator can also check for proper alignment between the cutting tool 20 and the workpiece wall. The workpiece is then rigidly clamped in the fixture 12 by locking the latch device 72. This also securely captures the fixture catch 78 in the fixture retainer 82.

The drive motor 22 is then turned on and the control handle 42 rotated to engage the cutting tool 20 with the workpiece. The fixture catch 78 and retainer 82 substantially reduce or eliminate vibration of the workpiece to provide a better finished tube end. The chip shield 130 prevents debris from entering the workpiece. After the workpiece is faced the handle 42 can be released so that the spring 44 retracts the spindle 18. The fixture 12 can then be opened and the workpiece removed.

If the next workpiece is differently dimensioned, the operator can exchange the proper collet 74 and can re-position the cutting tool 20 in a different tool pocket 102. Where a plurality of tools 20 are installed on the spindle 18, the tools 20 will already be aligned with the end face of the respective size workpiece since the fixture 12 holds a predetermined alignment of the workpiece to the cutting tool.

The invention has been described with reference to the preferred embodiments. Modifications and alterations will occur to others upon a reading and understanding of this specification. It is intended to include all such modifications and alterations insofar as they come within the scope of the appended claims or the equivalents thereof.

Having thus described the invention, it is claimed:

1. Facing apparatus comprising: a rigid stationary housing having a longitudinal axis; a spindle mounted in said housing; said spindle being rotatable about said axis; a cutting tool rotated with said spindle for facing a body when said tool engages the body; a fixture mounted on said housing; said fixture having a holder that opens and closes, said holder comprising first and second clamps pivotally joined together to open and close by pivoting movement of one of said clamps about a pivot axis that is parallel to said longitudinal axis; said one clamp having pivoting movement relative to said housing; a releasable latch mechanism that secures said first and second clamps together to close said holder; said holder retaining the body in alignment with said cutting tool when said holder is closed; and a fixture retainer mounted on said housing and that engages a catch on said one clamp that pivots when said holder is in its closed position.

2. The apparatus of claim 1 wherein the body is a hollow cylinder.

3. The apparatus of claim 1 wherein said first clamp is fixed to said housing; said second clamp being secured against axial and radial displacement by said fixture retainer when said second clamp is in its closed position.

4. The apparatus of claim 3 wherein said second clamp is pivotally attached to said first clamp.

5. The apparatus of claim 4 wherein said first and second clamps are generally hemispherical structures to retain a cylindrical body.

6. The apparatus of claim 3 wherein said second clamp comprises a fixture catch that engages said fixture retainer in said closed position.

7. The apparatus of claim 6 wherein said fixture retainer is attached to said housing.

8. The apparatus of claim 6 wherein said fixture retainer comprises a groove that receives and mates with said fixture catch when said second clamp is in said closed position.

9. The apparatus of claim 8 wherein said first and second clamps are pivotally connected at a hinge, and further wherein said groove and said fixture catch are arcuate relative to a rotation axis of said hinge.

10. The apparatus of claim 1 comprising a plurality of cutting tools carried on said spindle with each cutting tool having a respective radial position for facing respective body diameters.

11. The apparatus of claim 1 wherein said holder comprises first and second collets adapted to hold respective sizes of the body in said fixture.

12. The apparatus of claim 11 wherein said collets are interchangeable with additional collet pairs to permit said fixture to retain a variety of different sized bodies.

13. The apparatus of claim 12 wherein said spindle comprises an end face formed with recesses; each said recess being adapted to retain a cutting tool for facing a plurality of body sizes.

14. The apparatus of claim 13 wherein said fixture accepts body sizes from about 1/8 inch to about 2 inches for facing operations.

15. A fixture for holding a workpiece, comprising: a rigid stationary housing having a longitudinal axis; a workpiece holder having a first part secured to the housing and a second part pivotally connected to the first part so that the holder pivots open and closed by moving said second part from a first position to a second position respectively by pivoting about an axis that is parallel to said longitudinal axis, a latch device that clamps said first and second parts together to close said holder; said holder retaining the workpiece in a selected alignment when said holder is closed; and a fixture retainer on said housing that captures a catch on said holder second part when said holder is in its closed position.

16. The apparatus of claim 15 wherein said holder second part includes a fixture catch that is captured by said fixture retainer when said second part is in its closed second position.

* * * * *